(12) United States Patent
Rajagopal et al.

(10) Patent No.: US 8,842,760 B2
(45) Date of Patent: Sep. 23, 2014

(54) ENHANCED MULTI USER MIMO SCHEDULING

(71) Applicant: Broadcom Corporation, Irvine, CA (US)

(72) Inventors: Sriram Rajagopal, Bangalore (IN); Gowrisankar Somichetty, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 18 days.

(21) Appl. No.: 13/785,090

(22) Filed: Mar. 5, 2013

(65) Prior Publication Data

US 2014/0023154 A1    Jan. 23, 2014

Related U.S. Application Data

(60) Provisional application No. 61/672,391, filed on Jul. 17, 2012.

(51) Int. Cl.
*H04B 7/04* (2006.01)
*H04B 7/06* (2006.01)

(52) U.S. Cl.
CPC ............ *H04B 7/0456* (2013.01); *H04B 7/0452* (2013.01); *H04B 7/0639* (2013.01); *H04B 7/0632* (2013.01)
USPC ........... 375/260; 375/267; 375/299; 375/340; 375/347; 455/101; 455/132; 455/500; 455/562.1; 370/344; 370/464; 370/480; 341/173; 341/180

(58) Field of Classification Search
USPC .......... 375/260, 267, 299, 340, 347; 455/101, 455/132, 500, 562.1; 370/344, 464, 480; 341/173, 180
See application file for complete search history.

(56) References Cited

U.S. PATENT DOCUMENTS

| | | | |
|---|---|---|---|
| 2011/0090985 A1* | 4/2011 | Zhou et al. | 375/295 |
| 2012/0082102 A1 | 4/2012 | Kang et al. | |
| 2012/0213169 A1* | 8/2012 | Wang et al. | 370/329 |

FOREIGN PATENT DOCUMENTS

| | | |
|---|---|---|
| CN | 101 997 655 A | 3/2011 |
| WO | WO 2009/026770 A1 | 3/2009 |

OTHER PUBLICATIONS

Whitacre, Jan, A Primer on MIMO in LTE, For better spectrum use, Long Term Evolution (LTE) systems must employ multiple-input, multiple-output radios in special ways, Hearst Electronic Products, Inc., Feb. 1, 2010.

(Continued)

*Primary Examiner* — Leon Flores
(74) *Attorney, Agent, or Firm* — Brinks Gilson & Lione

(57) ABSTRACT

A spatial multiplexing scheduler in, for example, an eNB or other base station, determines rank n precoders for UEs. Each UE reports the preferred precoder from this set of rank n precoders. The preferred precoder results in imbalance in performance over m layers compared to the rest of (n−m) layers. The UEs also report channel quality to the eNB, from which the eNB determines which layer(s) is better for the UE. For example, when n=2 and m=1, the eNB may then select two UEs such that, for the same precoder used by the UEs, the first UE has much higher layer 1 performance than layer 2, and the second UE has much higher layer 2 performance than layer 1. These two UEs may then share the same frequency-time domain resources, with the first UE information sent/received on layer 1, while the second UE information is sent/received on layer 2.

20 Claims, 7 Drawing Sheets

(56) References Cited

OTHER PUBLICATIONS

White Paper, Maximizing LTE Performance Through MIMO Optimization, Rev. B, PCTEL, Inc., Apr. 2011.

Becker, Randall T., Precoding and Spatially Multiplexed MIMO in 3GPP Long-Term Evolution, High Frequency Electronics, Summit Technical Media, LLC, Oct. 2009.

Dahlman, Erik, et al., 4G LTE/LTE-Advanced for Mobile Broadband, Elsevier Ltd., 2011, pp. 161-173; 221-226.

European Search Report, Patent App. 13003080.2, Nov. 8, 2013, 4 pages.

ZTE, Performance Comparison of Unitary vs. Non-Unitary Precoding for MU-MIMO, 3GPP Draft, R1-062545, $3^{rd}$ Generation Partnership Project (3GPP), Mobile Competence Centre, Cedex, France, Oct. 4, 2006, 6 pages.

Texas Instruments, UE Feedback Mechanism to Support Single-User & Multi-User MIMO, 3GPP Draft, R1-063237 T1 MIMO UE Feedback, 3rd Generation Partnership Project (3GPP), Mobile Competence Centre, Cedex, France, Nov. 2, 2006, 4 pages.

Zhao, Dongyan, et al., Performance Comparison of Scheduling Algorithms for Multi-User MIMO, Beijing Institute of Technology, Beijing, P.R. China, Oct. 27, 2009, 4 pages.

\* cited by examiner

ENHANCED MULTI USER MIMO SCHEDULING

CROSS REFERENCE TO RELATED APPLICATIONS

This application claims priority to U.S. provisional application No. 61/672,391, filed Jul. 17, 2012, which is incorporated herein by reference in its entirety.

1. TECHNICAL FIELD

This disclosure relates to wireless communication. More particularly, this disclosure relates to Multiple-Input-Multiple-Output ("MIMO") communication techniques.

2. BACKGROUND

Continual development and rapid improvement in modern technology has resulted in the widespread availability and use of communication devices of all types, including wireless devices. Consumers and businesses continue to drive strong demand for devices with additional and enhanced capabilities. Consequently, communication device and component manufacturers are continually developing additional communication features for communication devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
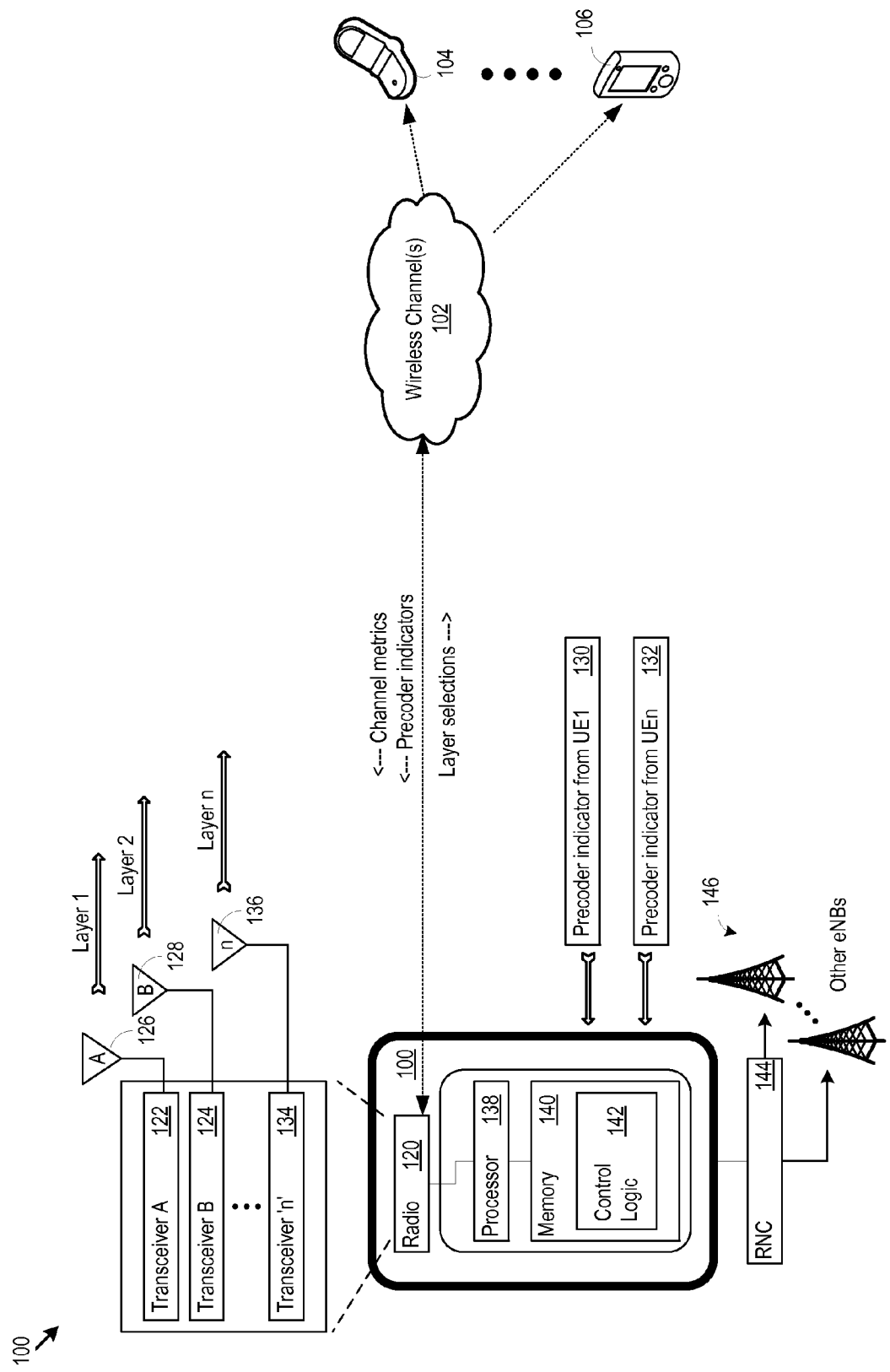
FIG. 1 shows a communication node, such as an enhanced Node B (eNB), that communicates with multiple User Equipments (UEs).

The discussion below makes reference to user equipment (UE), including various types of communication devices. UE may take many different forms and have many different functions. As one example, UE may be a cellular phone capable of making and receiving wireless phone calls. The UE may also be a smartphone that, in addition to making and receiving phone calls, runs general purpose applications. A UE may be virtually any device, including as additional examples wireless devices, routers or other network, a driver assistance module in a vehicle, an emergency transponder, a pager, a satellite television receiver, a networked stereo receiver, a computer system, music player, or virtually any other device. While different reference numbers for various UEs may be used in the drawings to focus attention on certain drawings, the different reference numbers do not imply that the UEs must be different UEs. Instead, any UE may implement the processing noted below.

The discussion below addresses how, using certain precoder information from different UEs, a base station may make a decision about which of the UEs can be combined and allocated on same frequency-time domain resources, and how to do so. The decision made by the base station may be directed at optimizing the use of communication resources. For instance, the base station may attempt to increase overall system throughput. In that regard, the base station may implement the techniques described below that find UEs to simultaneously share communication resources, as compared to prior scheduling techniques that do not recognize the opportunity for resource sharing. The base station may implement, for example, control logic such as a resource scheduler in hardware, software, or both, for making the decisions. The base station may be an evolved Node B (eNB) or another type of network controller. In other implementations, the decisions may be made instead by a Radio Network Controller (RNC) that is in communication with and that controls the eNB. Thus, as examples, the RNC may perform all or a portion of the processing noted below, such as receiving the preferred precoder indicators, searching for opposing layer imbalance, and deciding which UEs should share time and frequency resources, according to the techniques noted below. The RNC may then communicate the decisions to the eNB, which implements them with the UEs.

Multi-user Multiple Input Multiple Output (MIMO) deployments allow multiple users to share the same frequency-time domain resources, thereby achieving higher system level throughput. In, for example, in a Long Term Evolution/4G (LTE) system, an enhanced transmission mode (e.g., transmission mode 5) exists in which different UEs may recommend their preferred precoder to the their respective eNBs.

In some implementations, the there is a fixed mapping between code words that the UE and the eNB will send, and the layers upon which the code words can be sent. The eNB transmitter logic supports spatial multiplexing by applying a precoding matrix W to the signal before transmission. The UEs specify their preferred precoders to the eNB. The UEs may accomplish this by sending Precoder Matrix Indicators (PMIs) over a control channel to the eNB. In doing so, the UE may estimate the radio channel and select a particular preferred precoding matrix, e.g., one that provides maximum spectral efficiency.

As an aid in understanding the layer imbalance scheduling techniques described in more detail below, first consider the following system model:

1) Let $N_t$ be the number of transmit antennas that the eNB supports.

2) In the LTE transmission mode 5, only rank 1 spatial multiplexing may be available.

As a result of 1) and 2), the dimension of the precoder that the eNB may employ is given by $N_t \times 1$.

3) Consider a scenario in which two user equipments UE1 and UE2 are combined and allocated to the same time-frequency resources. Let the respective precoders for UE1 and UE2 be $W_1$ and $W_2$ respectively.

4) Let the information symbols to be transmitted to UE1 and UE2 be represented by $S_1$ and $S_2$ respectively.

5) The transmitted signal from eNB would be: $(W_1 \times S_1 + W_2 \times S_2)$.

6) Let H be the channel as seen at UE1. In such case, the received vector at the UE1 receive antennas would be: $Y = H(W_1 \times S_1 + W_2 \times S_2) + N$.

7) In the above, N is the sum of additive Gaussian noise and interference from other eNBs. If the number of receive antennas at UE1 is $N_r$, then the dimension of H is $N_r \times N_t$ and the dimension of Y is $N_r \times 1$.

Effective Signal to Interference Plus Noise Ratio (SINR):

In the above system model, the effective SINR as seen by UE1 may be given as:

$$SINR_{user1} = \frac{[(H \times W_1)^H \times (H \times W_1)]}{[(H \times W_2)^H \times (H \times W_2)] + N^H \times N}$$

And similarly if G is the channel that UE2 experiences, then the effective SINR as seen by UE2 is:

$$SINR_{user2} = \frac{[(G \times W_2)^H \times (G \times W_2)]}{[(G \times W_1)^H \times (G \times W_1)] + N^H \times N}$$

From the effective SINR calculations, the eNB may select UEs to share time and frequency resources such that in their respective SINR expressions, the signal powers (numerators) are maximized while the interferences (denominators) are minimized. This happens because the UEs make their own decisions about which precoders to use, and typically select a precoder that maximizes their own signal power. The UE typically cannot make the precoder decision based on the SINR, because, as noted below, the UE does not know the precoders in use by other UEs.

In one implementation, the UEs may report to the eNB the UE's preferred precoders. The reports may be sent to the eNB by any suitable messages, such as through wireless control or data channels, such as the Physical Uplink Control Channel (PUCCH). The preferred precoders may be reported in the form of a Precoder Matrix Index (PMI) selection.

In more detail, a given UE generally does not know which of the UEs are being shared on a communication resource (e.g., shared on the same time and frequency resource), and generally does not know the respective preferred precoders of the other UEs. As a result, the UE's PMI selection may often be based on maximizing its own signal power. Thus, the eNB may estimate or even guess which of the UEs can be combined such that overall system level throughput is maximized.

Note also that another problem arises since a given UE does not know the precoders in use by the other UEs. In particular, because of this lack of knowledge, the given UE cannot employ advanced receivers or reception techniques, such as successive interference cancellation or rank 2 detection.

To improve upon the situation described above, in a spatial multiplexing deployment (e.g., a rank 2 or higher rank), a precoder for each UE may be found which imbalances the performance on each of its two (or more) layers. Moreover, where the eNB antennas are spaced closely, at less than a predetermined spacing threshold, (e.g. Femto eNBs, Home eNBs, Relay transceivers, or other close spacing environments), the transmit correlation will be high, and in such cases imbalances between the layers are much more probable.

Accordingly, in one implementation, the eNB and UEs may implement the following logic in hardware, software, or both:

1) Instead of employing rank 1 precoders as their PMI selection, the eNBs may agree on a set of rank 2 precoders. Note that the size of each precoder may be <Ntx2>.

2) The PMI feedback mechanism may be implemented in the UE to report a rank 2 precoder as its preferred precoder, wherein that preferred precoder creates (e.g., maximizes) imbalance in performance between the two layers. For example, layer 1 may have much higher throughput than layer 2 for a given UE. More generally, the UE may determine that there is layer imbalance between multiple layers when a particular layer has performance that exceeds another layer by an imbalance threshold.

3) Additionally, the UEs may measure or otherwise obtain channel metrics on the multiple layers. The UEs may also report the channel metrics on a control channel to the eNB. The eNB may analyze the channel metrics to determine which of the multiple layers has better performance for each UE in terms of bandwidth, signal strength, capacity, SINR, throughput, noise, energy consumption, power needed to transmit or needed to receive, average number of packet retry requests, or any other performance criteria or combination of criteria. As one specific example, the UEs may report Channel Quality Information (CQI) as a channel metric to the eNB.

4) Consider the case of rank 2 communications, where there are two layers. The eNB may select UEs such that, for the same precoder employed by both UEs, the UE1 layer 1 performance is higher (e.g., by a predetermined performance threshold) than its layer 2 performance (e.g., the layer 1 performance may exceed the layer 2 performance by a preconfigured imbalance threshold), and such that the UE2 layer 2 capacity is higher (e.g., by a predetermined performance threshold) than its layer 1 performance.

5) Having found such UEs, the eNB may select the two UEs to share the same frequency and time domain resources. In doing so, the eNB may send the information for the UE1 on layer 1, and send the information for the UE2 on layer 2. In other words, although rank 2 precoders are specified, the information sent to a particular UE is sent on a specific layer, and not spread between multiple layers. The specific layer is the layer that has the best performance among multiple layers for the UE, and for which there is significant performance imbalance between the multiple layers in favor of the specific layer.

6) Additionally, since both the UEs know the precoders that they have specified, and that the eNB is matching UEs that have specified the same precoders, the UEs can do full Maximum Likelihood (ML) decoding on both layers (even though a given UE may only be interested on information in one of the layers). Hence, the performance may be much better.

Regarding downlink (DL) scheduling, in support of the techniques described above, the downlink control information sent by the eNB to the UEs may be extended to include layer selections. The layer selections may be an additional information bit within an existing control message or within a dedicated layer selection message, as examples. The layer selection may specify which of the multiple layers that the UE has been scheduled to communicate over. For example, when an information bit is used as the layer selection, and the bit is set, it may indicate to the UE that the UE should receive on layer 1. When the information bit is cleared, it may indicate that the UE should receive on layer 2.

In some implementations, the techniques described above may be implemented by UEs and eNBs that adhere to extensions as described above. The extensions may or may not be part of an agreed upon standard, and the eNB and UEs may implement the techniques regardless of whether or not the techniques are incorporated into a standard. As examples, the LTE or 802.16m standards may be extended to support the techniques described above. As specific examples, the standards may be extended in the following manners to support standardized adoption and implementation of the techniques noted above:

1) Introduce an additional transmission mode for the UEs in which they communicate preferred precoders (e.g., using a PMI) that cause layer imbalance, and receive feedback from the eNB (e.g., layer selections), and using Physical Downlink Shared Channel (PDSCH) scheduling for transmitting downlink data to the UEs.

2) Another alternative is to extend the LTE transmission mode 5 to include support for the multiple rank (e.g., Rank 2) Multiuser MIMO scheduling and PMI feedback mechanism described above.

The extensions noted above and the techniques described above may be employed in any other standards which support, e.g., closed loop MIMO. This includes all present 4G standards, for example.

FIG. 1 shows a communication node, such as an enhanced Node B (eNB) 100, that communicates over wireless channels 102 with multiple User Equipments (UEs). FIG. 1 shows the UE1 104 and the UE2 106, but there may be any number of UEs. The eNB 100 includes a wireless communication radio 120 that includes one or more transceivers, such as the transceiver A 122 and transceiver B 124. There may be any number of transceivers, as indicated by transceiver 'n' 134. A transceiver (e.g., transceiver A 122 or transceiver B 124) may include a Digital-To-Analog ("D/A") converter, an Analog-To-Digital ("A/D") converter, an amplifier, a modulator, a waveform shaper, preamplifier, power amplifier, and any additional hardware that drives an antenna (e.g., antenna A 126 or antenna B 128).

In the example of FIG. 1, the transceiver A 122 includes an antenna A 126, transceiver B includes an antenna B 128, and transceiver 'n' 124 includes an antenna 'n' 136. Each antenna may transmit an information stream and receive signals encoding information streams. Each stream is generally referred to as a 'layer'. Thus, for example layer 1 may be considered the information stream transmitted and received by the antenna A 126. In a multiple user MIMO system, there may be 2, 4, or more antennas over which the eNB transmits and receives. Each antenna may be associated with a particular layer.

The eNB 100 sends code words representing user data to the UEs. Precoding modifies the layer signals before transmission. The eNB may perform precoding for diversity, beam steering, spatial multiplexing, or other reasons.

The eNB 100 may implement multiple input/multiple output ("MIMO") communication techniques to communicate using multiple transceivers across the available communication resources to the UEs. The communication resources include time and frequency allocations for the UEs. The same communication resources (e.g., the same time and frequency slots) may be shared by multiple different UEs as described in more detail below. The communication resources may refer to communication channels used by communication standards such as 802.11a, 802.11b, 802.11g, 802.11n, or 802.11ac, Worldwide Interoperability for Microwave Access ("WiMAX"), Bluetooth, HSPA+, 4G, 3GPP LTE, and others.

The eNB 100 includes a processor 138 and a memory 140. The eNB 100 receives indicators (e.g., the indicators 130, 132) of preferred precoders from the UEs. The indicators may be in the form of PMIs, as one example. The eNB 100 may be controlled by an RNC 144. The RNC 144 may control other eNBs 146 as well. The memory 140 may store control logic 142 that implements a system model, such as the system model 200 shown in FIG. 2.

Figure 2:
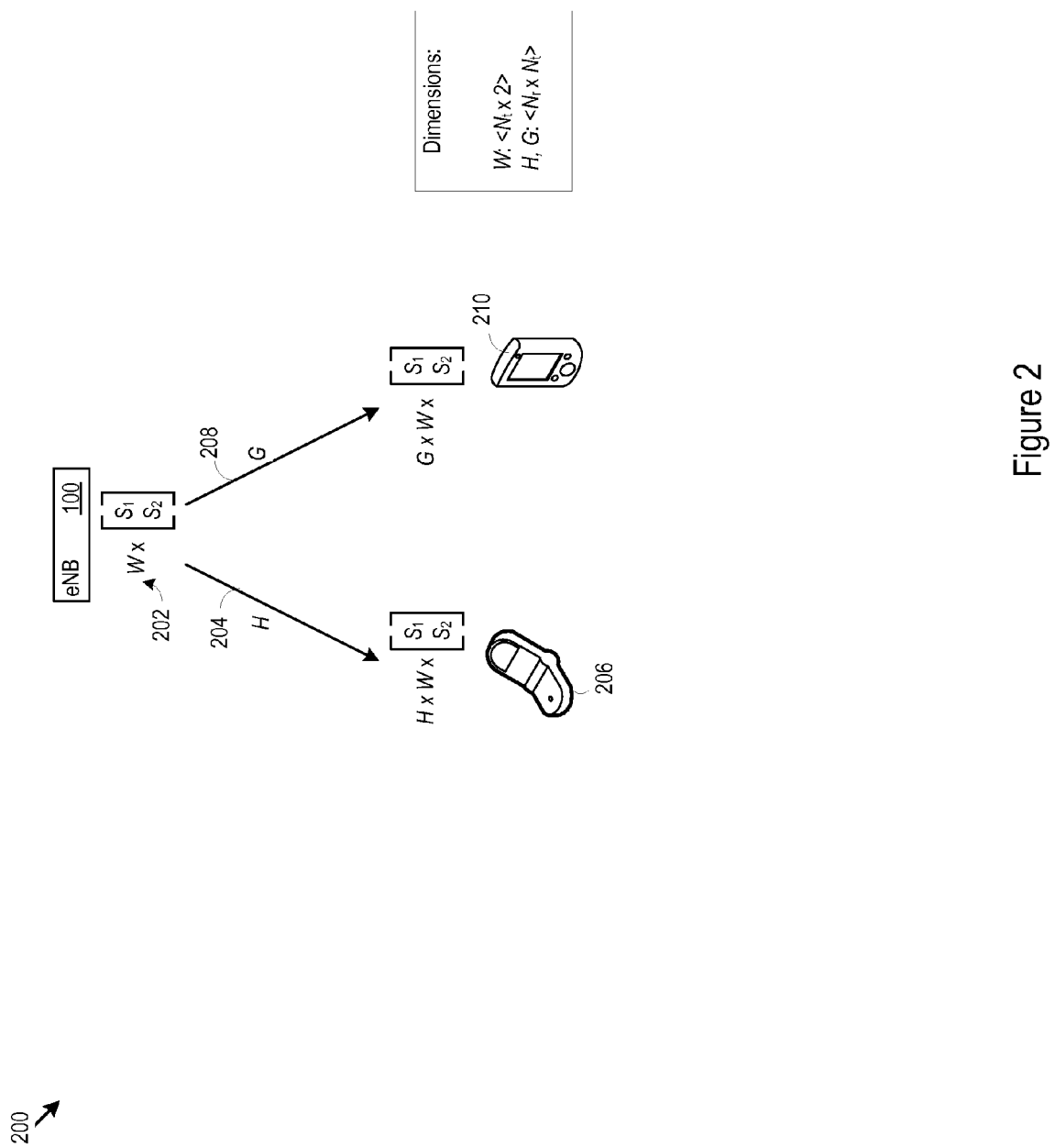
FIG. 2 shows an example system model that the eNB and the UEs may implement.

With regard to FIG. 2, the system model 200 shows that the eNB 100 will transmit to the UEs using a common preferred precoder, W 202. The common preferred precoder is, for example, a rank 2 precoder, and thus has dimension <Ntx2>, as opposed to a rank 1 precoder of dimension <Ntx1>. Each UE reports its preferred rank 2 precoder which purposefully increases (e.g., maximizes) performance imbalance between the available layers. Specifically, in a rank 2 MIMO system, each UE reports its preferred rank 2 precoder which, if used, would cause significant imbalance in performance between layer 1 and layer 2. In that regard, layer 1 may have a significant performance advantage over layer 2, or layer 2 may have a significant performance advantage over layer 1.

In FIG. 2, the eNB 100 communicates over channel H with UE1 206, and communicates over channel G 208 with UE2 210. Although rank 2 precoders have been indicated, the eNB 100 may communicate information for UE1 206 specifically over an individual layer (e.g., layer 1), and may communicate information for UE2 210 specifically over a different individual layer (e.g., layer 2). The processor 138 may, by executing the control logic 142, determine the preferred precoders indicated by the UEs. Recall that the preferred precoders result in a significant imbalance in capacity between the layers that the precoders apply to. The UEs also report channel metrics to the eNB 100, from which the control logic 142 determines which layer has better performance for the UE.

The control logic 142 may then select multiple UEs (e.g., two UEs, in a rank 2 MIMO system) such that, for the same precoder W 202 used by eNB 100 to send information to the UEs, opposing performance imbalance exists between the layers for the UEs. For example, the control logic 142 may determine that UE1 206 has much higher layer 1 capacity than layer 2, and that UE2 210 has much higher layer 2 capacity than layer 1. When such a match is found, the control logic 142 may select the UE1 206 and the UE2 210 to simultaneously communicate on the opposing layers using the preferred precoder that both UEs specified. For example, the eNB 100 may communicate information for the UE1 206 on layer 1, and communicate information for UE2 on layer 2. Accordingly, the UEs share the same frequency-time domain resources, with the first UE information sent on layer 1 by the eNB 100, while the second UE information is sent on layer 2 by the eNB 100. In other words, even though rank 2 precoders were indicated, the eNB 100 does not spread the information over both layers for a UE, but instead uses a particular layer to send the information for a given UE.

The principles discussed above may be extended to higher rank MIMO, such as rank four MIMO. In that case, four UEs may specify preferred rank 4 precoders, and receive information on one of four different specific layers, where the layer gives significant performance advantage over the other three layers in opposition to the other UEs. For example, UE1 may have best performance and receive on layer 3, UE2 may have best performance and receive on layer 1, UE3 may have best performance and receive on layer 4, and UE4 may have best performance and receive on layer 1.

Figure 3:
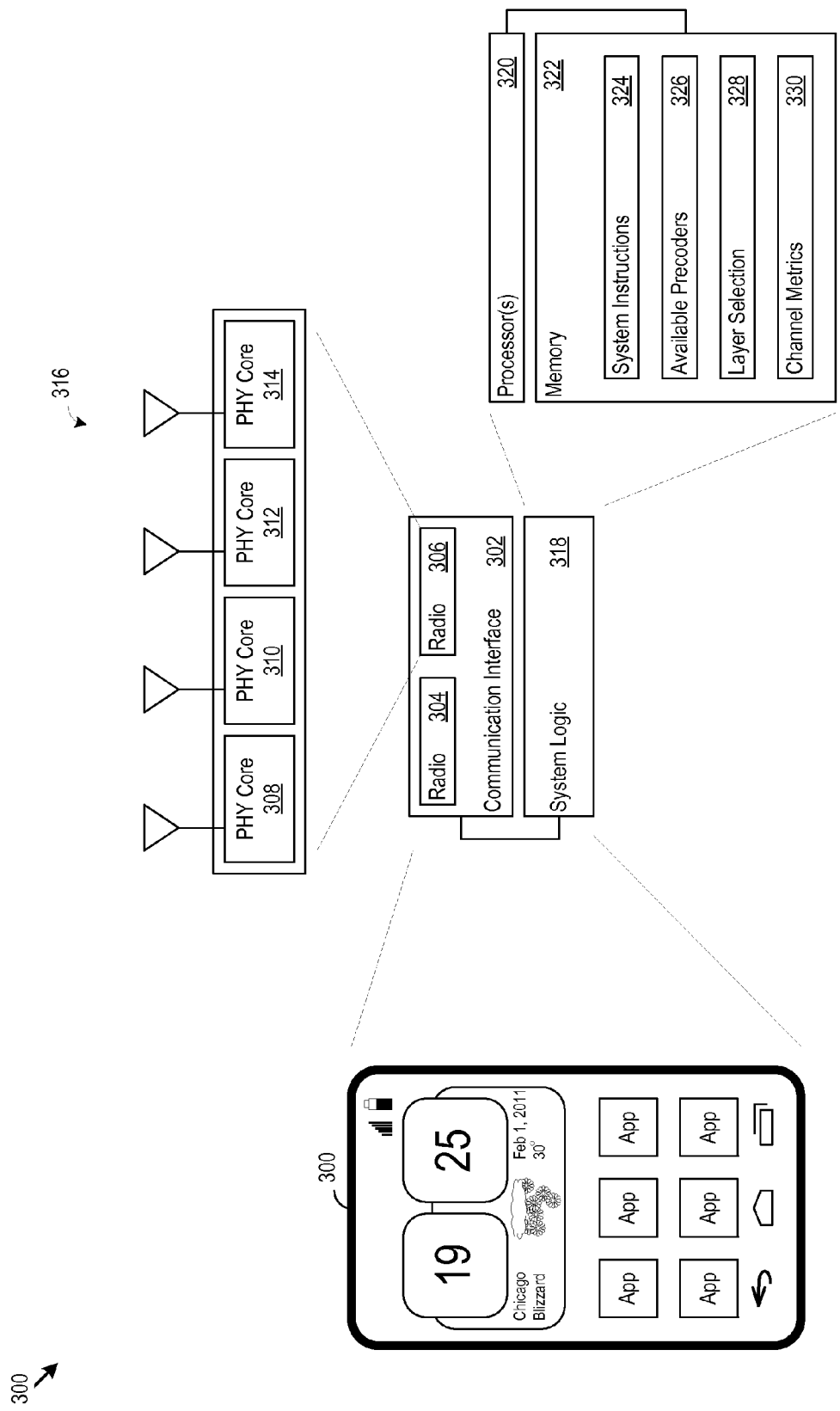
FIG. 3 shows an example of a UE.

FIG. 3 shows an example of User Equipment (UE) 300. The UE 300 may support MIMO communications through a communication interface 302. The communication interface 302 may include multiple radios, such as a radio 304 and a radio 306. Each radio of the UE 200 may be operable to communicate according to a communication type or standard. For example, the radios may be 2G, 3G, 4G/LTE radios, WiFi radios, Bluetooth radios, or any other type of wireless communication radios.

Each radio of the UE 200 may include multiple PHY cores. The radio 224 includes a PHY Core 308, a PHY Core 310, a PHY Core 312, and a PHY Core 314. A PHY Core may include a transmitter, a receiver, or both (e.g., a transceiver). The transceivers transmit and receive over individual antennas 316. Thus, the UE 200 may support MIMO communications (e.g., rank 2 or rank 4 MIMO in LTE mode 5) over the multiple antennas 316.

The UE 200 also includes system logic 318, which is communicatively coupled to the communication interface 302. The system logic 318 may be implemented in hardware, software, or both, such as with a processor 320 (or multiple processors) and a memory 322 communicatively coupled to the processor 320. The memory 322 may store system instructions 324, that when executed by the processor 320, cause the UE 200 to communicate preferred precoder information as described above, for example with regard to the system model 200. The system instructions 324 may also report to the eNB 100 the channel metrics 330 for the layers to which the preferred precoders apply. The preferred precoder may be selected from among a set of available precoders 326, and the available precoders may be selected from a codebook of such precoders. The codebook may be specified by a particular communication standard, for example. More generally, the codebook may be established by storing any desired set of precoders in the memory 322 and in the eNB 100. As further described above, the UE 200 may receive layer selections 328 from the eNB 100. Accordingly, the UE 200 may inform the communication interface 302 as to the layer in which it will receive its data stream from the eNB 100.

Figure 4:
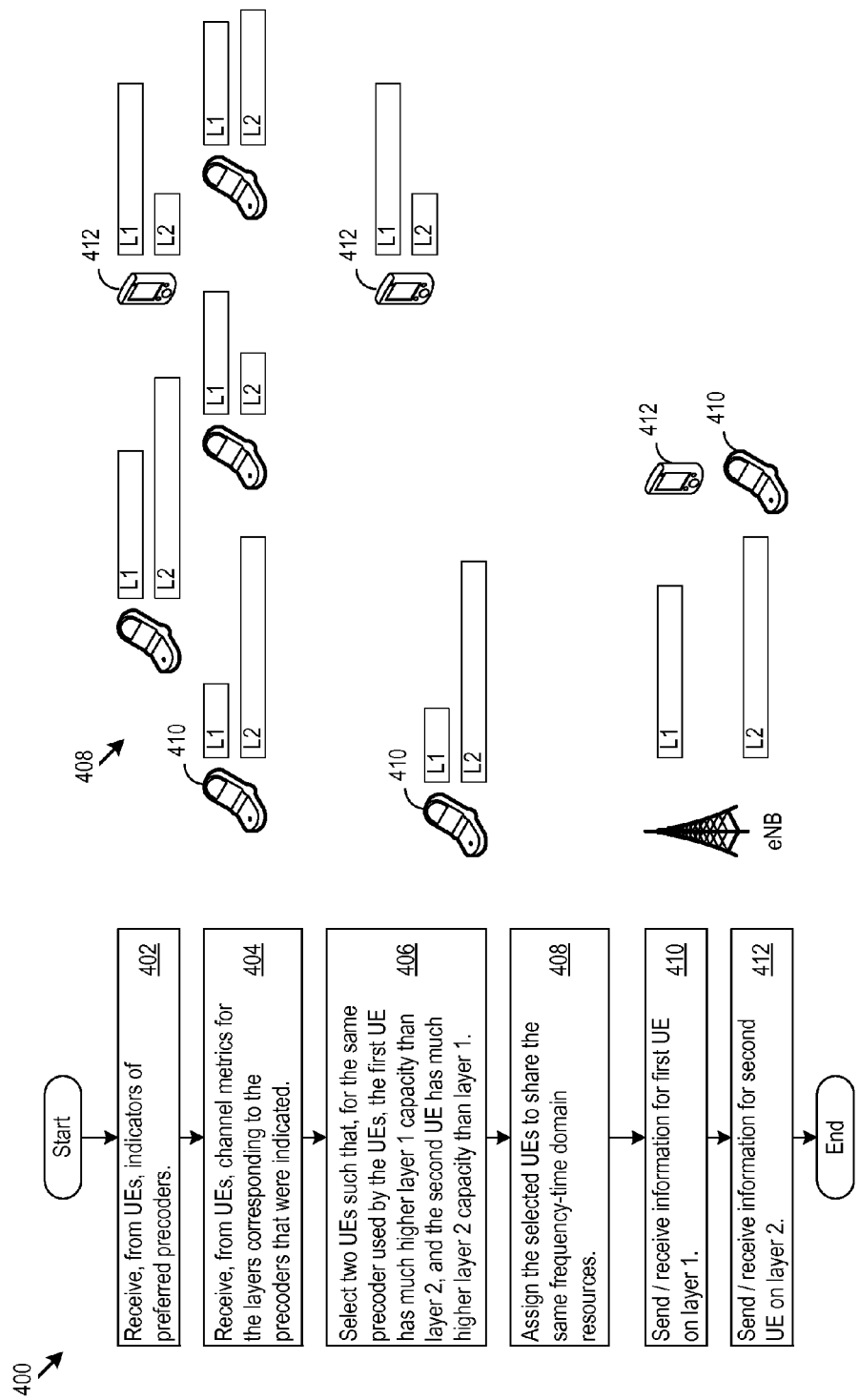
FIG. 4 shows logic for scheduling according to layer performance imbalance.

FIG. 4 shows logic 400 for scheduling according to layer capacity imbalance. The logic 400 may be implemented in the eNB 100 as, for example, part of the control logic 142. The logic 400 receives, from UEs, indicators of preferred precoders (402). The preferred precoders may be any of the available rank 2 or rank 4 precoders that would cause performance imbalance between the layers to which the precoders apply. In one implementation, the UEs report, as their preferred precoder, the precoder that maximizes performance imbalance among the layers. The logic 400 also receives, from UEs, channel metrics for the layers corresponding to the precoders that were indicated as preferred precoders (404). The channel metrics provide insight into the amount of imbalance between the layers. FIG. 4 illustrates, as just one example, a set of five UEs 408 that have reported their preferred precoders and channel metrics.

In a rank two scenario, the eNB 100 may then search to find UEs that will share communication resources, according to specific search criteria. For example, the search criteria may be opposing layer imbalance, e.g., the eNB 100 selects UEs such that, for the same precoder used by the UEs, the first UE has significantly higher layer 1 capacity than layer 2 capacity, and the second UE has significantly higher layer 2 capacity than layer 1 (406). In determining whether a layer has significantly higher capacity, the eNB 100 may determine whether the capacity imbalance between layers exceeds an imbalance threshold.

When the search finds two UEs that meet the search criteria, such as the UEs 410 and 412, the eNB 100 may select the UEs to share the same frequency-time domain resources (408). In that regard, the eNB 100 will use the same preferred precoder for the selected UEs and the same time and frequency resources. However, the eNB 100 transmits information for the first UE on layer 1 (410), its higher performance layers, and transmits information for the second UE on layer 2 (412), its higher performance layer. Thus, the eNB 100 does not spread the information for a particular UE across multiple layers, even though rank 2 precoders are specified, but instead sends the information specific for a particular UE on the specific higher performing layer.

Figure 5:
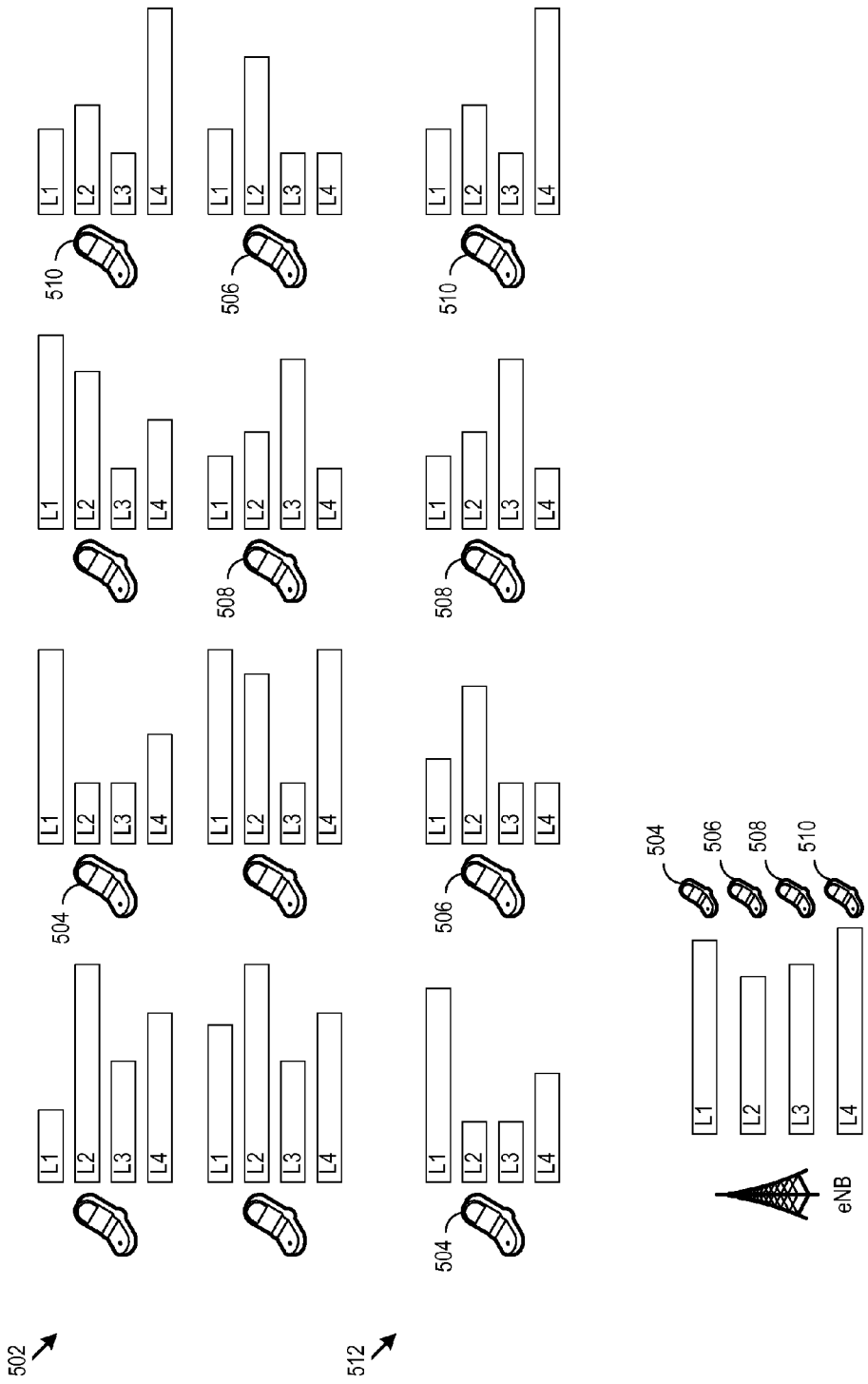
FIG. 5 shows an example using rank 4 precoders.

As shown in FIG. 5, the techniques discussed above and shown in the figures may be extended to additional ranks, e.g., rank 4. In FIG. 5, the UEs 502 report preferred rank 4 precoders, and channel metrics for the layers to which the precoder applies. The preferred precoder may be the precoder for which one layer has significantly higher capacity than the other three layers. The eNB 100 may search among the UEs 502 to find four UEs 512 that have the same preferred precoder, and opposing layer imbalance. In the example of FIG. 5, the UEs 504, 506, 508, and 512 have opposing layer imbalance in that each of the UEs has a different layer for which performance significantly exceeds the other layers: for UE 504 it is layer 1, for UE 506 it is layer 2, for UE 508 it is layer 3, and for UE 510 it is layer 4.

The eNB 100 selects UEs with opposing layer imbalance to share the same frequency-time domain resources. Accordingly, in this example, layer 1 will serve the UE 504, layer 2 will serve the UE 506, layer 3 will serve the third UE 508, and layer 4 will serve the UE 510. The eNB 100 sends information specific to a particular UE on the specific layer (e.g., information for UE 506 on layer 2). More generally, the eNB 100 may send information for a particular UE on 'L' layers out of an available 'M' layers. The eNB 100 may do so, for example, when the 'L' layers exhibit strong performance advantages over the remaining 'M–L' layers, which may then be assigned to other UEs.

In other implementations, the eNB 100 may take other actions when the eNB 100 does not find UEs to select to share the same communication resources. For instance, the eNB 100 may instead inform the specific non-matched UEs (e.g., over the control channel) that rank 1 transmissions will be sent. The eNB 100 may then communicate information to those UEs using rank 1 transmissions.

Figure 6:
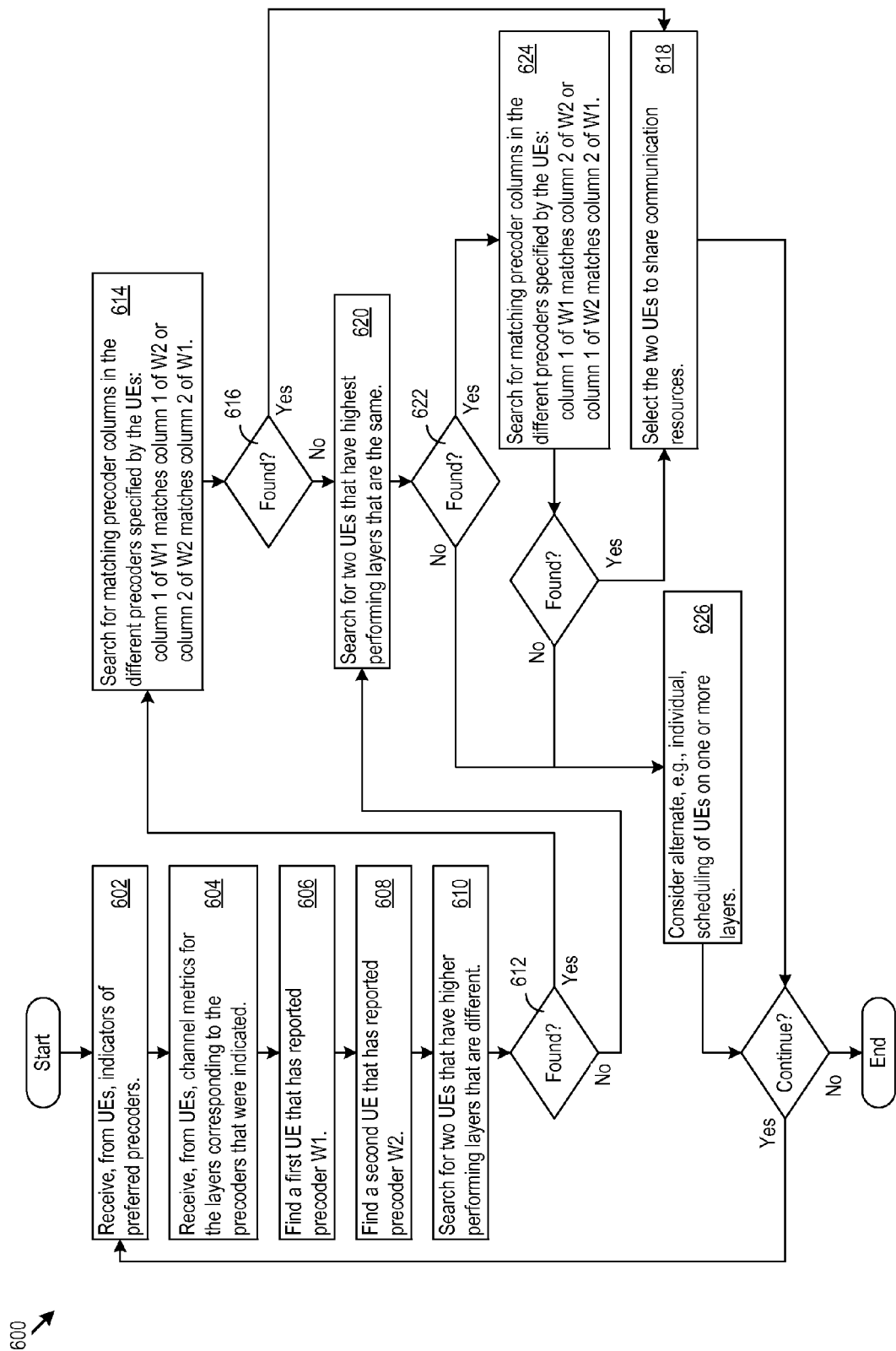
FIG. 6 shows logic for searching for UEs to assign to layers.

FIG. 6 shows another example of logic 600 that the eNB may implement to provide an additional search strategy for selecting UEs to share communication resources. The eNB 100 may execute the logic 600 whenever desired, such as when the logic 400 does not find UEs that have specified the same precoder with opposing layer imbalance, as described above. In addition, the eNB 100 may execute the logic 600 over the remaining, unmatched UEs, when some UEs have been matched by layer imbalance as described above, and there yet remain some unmatched UEs. Note that, as before, the logic 600 receives indicators of preferred precoders from UEs (602), and also channel metrics for the layers corresponding to the precoders that were indicated (604).

The eNB 100 finds a first UE that has reported precoder W1 (606), and finds a second UE that has reported precoder W2. The eNB 100 determines whether, e.g., the highest performing column of a precoder (e.g., W1) matches the column that is not the highest performing column of the other precoder (e.g., W2). When this condition exists, the eNB 100 may select the first UE and the second UE to share communication resources.

In more detail, the eNB 100 searches for two UEs that have higher performing layers that are different (610). Assume, for example, that the first UE best performing layer is layer 1, and that the second UE best performing layer is layer 2, even if they have specified different precoders. If such UEs are found (612), then the eNB may assign the two UEs to share communication resources, when at least one column of W1 matches a column of W2. For example, there is a match when column 1 of W1 matches column 1 of W2, and a match when column 2 of W2 matches column 2 of W1 (614). In response to the match (616), the eNB 100 selects the two UEs to share communication resources (618). The first UE will receive its information on layer 1, and the second UE will receive its information on layer 2. In the eNB 100, the eNB will use precoder W1 when column 1 of W1 matches column 1 of W2. In this scenario, the first UE has the advantage. When column 2 of W1 matches to column 2 of W2, then the eNB 100 uses the precoder W2. In this scenario, the second UE has the advantage.

Furthermore, independently of the analysis above in (610)-(614), or in a different order, the eNB 100 may perform another check, also shown in FIG. 6. In particular, the eNB 100 may search for UEs that have highest performing layers that are the same (620), with different indicated precoders. For example, assume that the first UE and the second UE both have layer 1 as the preferred or highest performing layer. When such UEs are found (622), then the eNB 100 may search (624) for matching precoder columns in the different precoders specified by the UEs, such that column 1 of W1 matches column 2 of W2, or column 1 of W2 matches to column 2 of W1 (624). In response to the match (626), the eNB 100 selects the two UEs to share communication resources (618). The first UE will receive its information on layer 1, and the second UE will receive its information on layer 2. In the eNB 100, the eNB will use the W1 precoder when column 1 of W1 matches to column 2 of W2. Effectively, the eNB has thereby scheduled the first UE on layer 1 and has scheduled the second UE on layer 2. The first UE has the advantage. When column 2 of W1 matches to column 1 of W2, then the eNB uses the W2 precoder. This results in scheduling the second UE on layer 1, and scheduling the first UE on layer 2. The second UE has the advantage.

Further, when the eNB 100 cannot match UEs as described above to share communication resources, the eNB 100 may perform alternative scheduling (626). In one implementation, the eNB 100 may determine to not share communication resources between UEs. For instance, the eNB 100 may schedule only rank 'L' multiplexing (e.g., rank 1) for a particular UE, so that communications are sent to that specific UE only, on those 'L' layers. In other words, no other UEs share the time and frequency resources with that specific UE. In that case, when, for example, the UE's first layer is better performing than the second layer, then the eNB 100 may select the first column of the UE's preferred precoder. The eNB 100 uses the first column as a rank 1 precoder for communicating with the UE, e.g., on the first layer. Similarly, when the UE's second layer is higher performing than the first layer, then the eNB 100 may select the second column of the preferred precoder. The eNB uses the selected column as a rank 1 precoder for communicating to the UE over, e.g., the second layer. As a further scheduling example, the eNB 100 may determine to schedule a pure rank-2 spatial multiplexing to a particular UE. Then, the eNB 100 may allocate the preferred rank-2 precoder and schedule both layers to the same UE.

For all of the techniques described above, the eNB 100 may introduce additional bits or fields into control frames communicated to the UEs on a downlink control channel. The additional bits or fields may communicate the particular configuration information for the scheduling chosen for the UE, including layer selection, precoder selection, communication rank, and other configuration information.

As one example of additional configuration information, the eNB 100 may communicate to a UE the transmission parameters selected for any different UE. For instance, the eNB 100 may send to UE1 the modulation employed by UE2, where UE1 and UE2 share communication resources. With this information, UE1 may perform enhanced decoding. For example, the UE1 may perform maximal likelihood (ML) decoding for both UEs. That is, instead of only decoding the information for UE1, the UE1 may perform a joint decoding of the information for UE1 and UE2. The UE1 may then filter out information that is not useful for the UE1, such as all or part of the information intended for UE2.

Some of the techniques above discuss rank 1 scheduling through rank 2 precoder selection. Note, however, that the scheduling may be generalized to any rank 'm' scheduling through rank 'n' precoder selection, where 'm'<-'n'. As one specific example with m=1 and n=4, the techniques may implement rank 1 scheduling through rank 4 precoder selection. One example was given above in FIG. 5.

Figure 7:
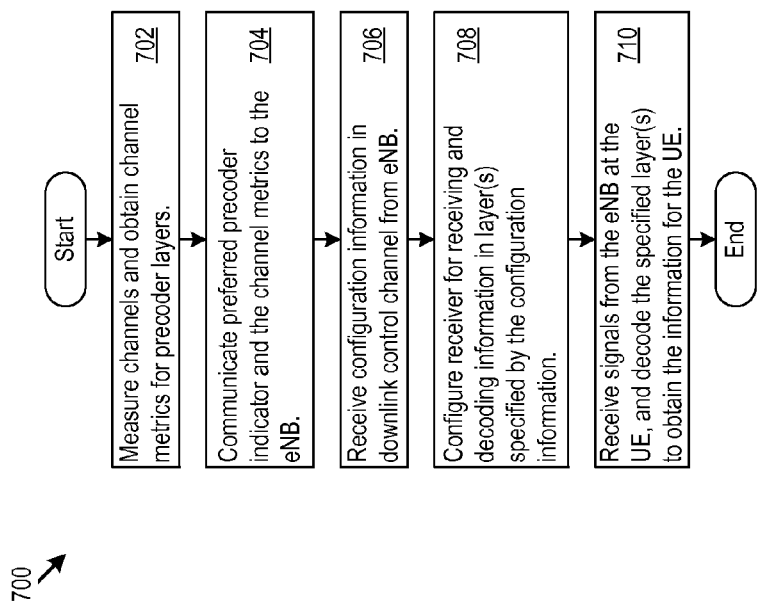
FIG. 7 shows logic that a UE may implement for scheduling according to layer performance imbalance.

FIG. 7 shows logic 700 that a UE may implement (e.g., as part of the system instructions 324) for scheduling according to layer performance imbalance. The logic 700 measures channel characteristics and obtains channel metrics that apply, for example, precoder layers (702). In that respect, the logic 700 may determine bandwidth, signal strength, capacity, SINR, throughput, noise, energy consumption for sending or receiving on a particular layer, power needed to transmit or needed to receive on a particular layer, average number of packet retry requests, or any other performance criteria or combination of criteria. As another specific example, the logic 700 may determine Channel Quality Information (CQI) as a channel metric.

The logic 700 communicates its preferred precoder (e.g., a rank 2 precoder specified by a PMI), and the channel metrics, to the eNB (704). The eNB 100 engages in an analysis of the indicated precoders, and the channel metrics, as described above. When the eNB 100 has determined scheduling for the UEs, the eNB 100 communicates configuration information for the scheduling to the UEs. The configuration information may be placed in bit fields in frames sent in a downlink control channel. Accordingly, the logic 700 receives the configuration information (706).

With the configuration information, the UE configures its receiver to receive and decode information in the layer(s) specified by the configuration information (708). For example, although the UE specified a rank 2 precoder, the configuration information may direct the UE to receive its information in a particular layer among the two layers. Having configured its receiver, the UE may then receive signals from the eNB 100, and decode the specified layer(s) to obtain the information for the UE (710).

Regarding terminology, the following exemplary description is provided. Code words generally refer to information that higher layers send to the transmit chain for communicating information to the UEs. There is typically a specific flow of one or more different code words destined for each UE. In the transmit chain, a layer mapping module accepts the code words for one or for multiple UEs. The layer mapping module may, but need not, split a particular code word across multiple layers. The layer mapping module outputs symbols for transmission assigned to the various layers.

Precoding takes the symbols as inputs. When the number of layers input to the precoding logic is 'm' and the number of transmit antenna ports is 'n', then typically the precoding matrix is a of size <n×m>. The precoding matrix (e.g., of <m×n>) is multiplied against the symbol (e.g., of dimension <n×1>) to obtain an output of symbols (e.g., of dimension <m×1>) for transmission through the 'n' antenna ports. The number of layers that form the input to the precoding logic is referred to as the Rank. In the example given, the rank is 'm'.

Let the input symbols from different layers be represented by:

$$S = \begin{bmatrix} s_1 \\ s_2 \\ \vdots \\ s_m \end{bmatrix}, \text{size: } \langle m \times 1 \rangle$$

Let the precoder matrix be represented by:

$P = [P_1 P_2 \ldots P_m]$, size:$\langle n \times m \rangle$

In the precoder matrix each column is denoted by $P_x$ whose size is $\langle n \times 1 \rangle$. There are m columns.

The precoding output is given by:

$$P \times S = [P_1 \quad P_2 \quad \ldots \quad P_m] \times \begin{bmatrix} s_1 \\ s_2 \\ \vdots \\ s_m \end{bmatrix}$$

$$= (s_1 \times P_1) + (s_2 \times P_2) + \ldots (s_m \times P_m)$$

Whose size is $\langle n \times 1 \rangle$. Each of the 'n' parts of this symbol goes to different transmit antenna ports.

In the above, one can see that each column of the precoding matrix corresponds to a particular layer. As a result, each particular column of the precoding matrix is typically considered associated with a particular layer. If the precoding matrix is not an Identify matrix, then the precoding operation spreads the layers for transmission by multiple antennas.

The methods, devices, and logic described above may be implemented in many different ways in many different combinations of hardware, software or both hardware and software. For example, all or parts of the logic may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in UE, and eNB, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   receiving, from first user equipment, a first indicator specifying a first preferred precoder for simultaneously communicating on a first layer and on a second layer of a communication resource;
   receiving, from second user equipment, a second indicator specifying a second preferred precoder different from the first preferred precoder, the second preferred precoder for simultaneously communicating on the first layer and on the second layer of the communication resource;
   determining that a column of the first preferred precoder matches a column of the second preferred precoder; and
   responsive to the determination, selecting a shared precoder from among the first and second preferred precoders; and
   selecting the first user equipment and the second user equipment to simultaneously communicate on the first layer and second layer using the shared precoder.

2. The method of claim 1, further comprising determining that a performance imbalance exists by:
   determining that when the first preferred precoder is used by both the first user equipment and the second user equipment, the first user equipment has higher performance than the second user equipment.

3. The method of claim 2, further comprising:
   receiving, from the first user equipment and the second user equipment, channel performance metrics for the first layer and the second layer; and wherein determining higher performance comprises:
   determining higher channel quality, higher throughput, higher signal to noise plus interference ratio, or any combination thereof.

4. The method of claim 1, further comprising:
   receiving, from the first user equipment and the second user equipment, channel metrics for the first layer and the second layer; and wherein determining comprises:
   determining a performance imbalance using the channel metrics.

5. The method of claim 1, wherein receiving the first indicator comprises receiving a preferred matrix indicator that specifies the preferred precoder.

6. The method of claim 1, wherein receiving the first indicator comprises:
   receiving a first indicator of a multi-user multiple input multiple output (MIMO) communications precoder of at least rank 2.

7. A system comprising:
   a multiple input multiple output (MIMO) communications interface that supports simultaneous transmission through multiple antennas in a first layer and in a second layer; and
   system circuitry in communication with the MIMO communications interface, the system circuitry operable to:
   obtain indicators of preferred precoders from user equipments for simultaneously communicating in the first layer and the second layer;

search the indicators for a first user equipment among the user equipments that specified a first preferred precoder;

search the indicators for a second user equipment among the user equipments that specified a second preferred precoder different from the first preferred precoder, a column from the first preferred precoder being the same as a column from the second preferred precoder;

based on the columns, select a shared precoder from among the first and the second precoders; and select the first user equipment and the second user equipment to simultaneously communicate on the first layer and the second layer using the shared precoder.

8. The system of claim 7, wherein the system circuitry is further operable to:

when the searches are successful:

determine that the first layer has higher performance than the second layer for the first user equipment; and communicate to the first user equipment a layer selection that specifies the first layer for receiving transmissions.

9. The system of claim 8, wherein the system circuitry is further operable to:

when the searches are successful:

communicate to the second user equipment a layer selection that specifies the second layer for receiving transmissions.

10. The system of claim 9, wherein the system circuitry is further operable to:

transmit simultaneously, using the shared precoder:

information for the first user equipment in the first layer; and information for the second user equipment in the second layer.

11. The system of claim 7, wherein the system circuitry is further operable to:

when the searches are not successful:

further search for a third user equipment and a fourth user equipment among the user equipments that:

have the same preferred precoders; and have opposing layer capacity imbalance in the first layer and in the second layer.

12. The system of claim 7, wherein the system circuitry is further operable to:

determine that the first user equipment has higher performance when the first preferred precoder is used; and determine that the second user equipment has higher performance when the second precoder is used.

13. The system of claim 12, wherein higher performance comprises higher channel quality, higher throughput, higher signal to noise plus interference ratio, or any combination thereof.

14. The system of claim 7, wherein the different preferred precoders comprise precoders for at least rank 2 MIMO communications.

15. A method comprising:

receiving, from user equipments, indicators of preferred precoders for simultaneously communicating on at least a first layer and a second layer;

receiving channel metrics for the first layer and the second layer from the user equipments;

determining a communication group of at least a first user equipment and a second user equipment to simultaneously communicate over at least the first layer and the second layer by:

determining those user equipments that have specified different preferred precoders that have a matching column; and based on a position of the matching column, selecting a shared precoder from among the different precoders for use by the first and second user equipments for communication over the first and second layers.

16. The method of claim 15, further comprising:

transmitting information for the first user equipment to the first user equipment in the first layer; and transmitting information for the second user equipment to the second user equipment in the second layer.

17. The method of claim 15, further comprising:

communicating to the first user equipment a layer selection indicator that specifies in which layer information for the first user equipment will be transmitted.

18. The method of claim 15, wherein receiving channel metrics comprises:

receiving channel quality indicators.

19. The method of claim 15, wherein receiving channel metrics comprises:

channel capacity for the first layer and the second layer.

20. The method of claim 15, wherein receiving indicators of preferred precoders comprises:

receiving indicators of preferred precoders for multi-user multiple input multiple output (MIMO) communications.

* * * * *